(12) United States Patent
Yang (10) Patent No.: US 11,570,750 B2
(45) Date of Patent: *Jan. 31, 2023

(54) METHOD FOR PAGING, ACCESS NETWORK DEVICE, AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,338

(22) Filed: Jan. 13, 2021

(65) Prior Publication Data
US 2021/0157908 A1 May 27, 2021

Related U.S. Application Data

(63) Continuation of application No. 16/624,006, filed as application No. PCT/CN2017/099352 on Aug. 28, 2017, now Pat. No. 10,932,225.

(51) Int. Cl.
*H04W 4/00* (2018.01)
*H04W 68/02* (2009.01)
(Continued)

(52) U.S. Cl.
CPC .......... *H04W 68/02* (2013.01); *G06F 21/552* (2013.01); *G06N 7/005* (2013.01); *G06N 20/00* (2019.01);
(Continued)

(58) Field of Classification Search
CPC . H04W 36/32; H04W 52/0254; H04W 48/20; H04W 76/27; H04W 76/28
(Continued)

(56) References Cited

U.S. PATENT DOCUMENTS 9,497,670 B2 ‡ 11/2016 Lee .................. H04W 36/0061
10,750,380 B2 * 8/2020 Fujishiro ........... H04W 52/0254
(Continued)

FOREIGN PATENT DOCUMENTS

CN 1810059 A ‡ 7/2006 ............ H04W 68/00
CN 1810059 A 7/2006
(Continued)

OTHER PUBLICATIONS

Extended EP Search Report for EP Application 17923758.1 dated May 26, 2020.‡
(Continued)

*Primary Examiner* — David Q Nguyen
(74) *Attorney, Agent, or Firm* — Young Basile Hanlon & MacFarlane, P.C.

(57) ABSTRACT

Implementations of the present application disclose a method for paging, an access network device and a terminal device. The method includes: an access network device receives movement information of a terminal device sent by the terminal device; the access network device determines, according to the movement information, a target paging area where the access network device initiates paging to the terminal device; and the access network device sends the target paging area to the terminal device. The method, access network device and the terminal device according to the implementations of the present application are beneficial for the access network device to configure a reasonable paging area, thereby reducing signaling overhead.

22 Claims, 4 Drawing Sheets

(51) Int. Cl.

| | | |
|---|---|---|
| *H04W 76/27* | (2018.01) | |
| *H04W 24/10* | (2009.01) | |
| *H04W 36/00* | (2009.01) | |
| *H04W 36/08* | (2009.01) | |
| *H04W 48/20* | (2009.01) | |
| *H04W 64/00* | (2009.01) | |
| *G06N 20/00* | (2019.01) | |
| *G06F 21/55* | (2013.01) | |
| *G06N 7/00* | (2006.01) | |

(52) U.S. Cl.
CPC ....... *H04W 24/10* (2013.01); *H04W 36/0083* (2013.01); *H04W 36/08* (2013.01); *H04W 48/20* (2013.01); *H04W 64/003* (2013.01); *H04W 76/27* (2018.02); *G06F 2221/034* (2013.01)

(58) Field of Classification Search
USPC ......... 455/436, 458; 370/328, 329, 330, 331
See application file for complete search history.

(56) References Cited

U.S. PATENT DOCUMENTS

| | | | | |
|---|---|---|---|---|
| 2005/0038596 | A1‡ | 2/2005 | Yang | G08G 1/096883 |
| | | | | 701/53 |
| 2005/0197125 | A1 | 9/2005 | Kang et al. | |
| 2007/0104156 | A1 | 5/2007 | Inoue et al. | |
| 2014/0287756 | A1* | 9/2014 | Yang | H04W 48/16 |
| | | | | 455/436 |
| 2014/0302880 | A1* | 10/2014 | Godin | H04W 68/04 |
| | | | | 455/458 |
| 2015/0282022 | A1‡ | 10/2015 | Yang | H04W 36/245 |
| | | | | 455/437 |
| 2017/0070981 | A1* | 3/2017 | Anderson | H04W 72/042 |
| 2017/0230883 | A1‡ | 8/2017 | Dang | H04W 48/16 |
| 2017/0245240 | A1* | 8/2017 | Kim | H04W 48/16 |
| 2017/0245318 | A1* | 8/2017 | Rayavarapu | H04W 76/28 |
| 2018/0092155 | A1* | 3/2018 | Hong | H04W 36/32 |
| 2018/0192426 | A1* | 7/2018 | Ryoo | H04W 74/0833 |
| 2019/0215800 | A1* | 7/2019 | Fujishiro | H04W 8/08 |
| 2020/0037345 | A1* | 1/2020 | Ryoo | H04W 72/1284 |

FOREIGN PATENT DOCUMENTS

| | | | | |
|---|---|---|---|---|
| CN | 101064923 A | ‡ | 10/2007 | |
| CN | 101064923 A | | 10/2007 | |
| CN | 101686467 A | | 3/2010 | |
| CN | 103428853 A | ‡ | 12/2013 | ............. H04W 4/70 |
| CN | 103428853 A | | 12/2013 | |
| EP | 3499974 A1 | | 6/2019 | |
| EP | 3528562 A1 | ‡ | 8/2019 | ............ H04W 68/02 |
| EP | 3528562 A1 | | 8/2019 | |
| RU | 2481743 C2 | ‡ | 5/2013 | ......... H04W 52/0216 |
| RU | 2481743 C2 | | 5/2013 | |
| WO | 2005086379 A1 | | 9/2005 | |
| WO | WO-2005086379 A1 | ‡ | 9/2005 | .......... H04W 52/287 |

OTHER PUBLICATIONS

3GPP TR 23.799 vi 4.0.0; (Dec. 2016); XP; 3rd Generation Partnership Project; Technical Specification Group Services and System Aspects; Study on Architecture for Next Generation System; (Release 14); XP51295448A.‡
3GPP TSG-RAN Working Group 2 meeting #97; R2-1700671; Athens, Greece, Feb. 13-17, 2017.‡
3GPP TSG-RAN WG2 Meeting #95; Goteborg, Sweden, Aug. 22-26, 2016; R2-165303.‡
Russia First Office Action with English Translation for RU Application 2019141766/07(081452) dated Sep. 16, 2020.‡
https://patents.google.com/patent/CN103428853A/en (Year: 2017).‡
3GPP TSG-RAN WG2 Meeting #95 R2-165303 Goteborg, Sweden, Aug. 22-26, 2016 (Year: 2016).‡
Australian Examination Report for AU Application 2017429661 dated Mar. 22, 2021. (5 pages).
Communication pursuant to Article 94(3) EPC for EP Application 17923758.1 dated Feb. 25, 2021. (5 pages).
India Examination Report for IN Application 201917052066 dated May 11, 2021. (6 pages).
LG Electronics Inc., State transition to RRC Connected, 3GPP TSG-RAN WG2 Meeting #96, R2-168706, Nov. 14-18, 2016. (5 pages).
Australian Examination Report for AU Application 2017394023 dated Aug. 24, 2021. (3 pages).
Communication pursuant to Article 94(3) EPC for EP Application 17923758.1 dated Aug. 3, 2021. (8 pages).
Singapore Invitation to Respond to Written Opinion for SG Application 11201912349R dated Jul. 23, 2021. (7 pages).
Internatinal Search Report for PCT/CN2017/099352 dated May 21, 2018.
Chinese First Office Action with English Translation for CN Application 202010672216.8, dated Dec. 2, 2022. (13 pages).
Extended European Search Report for EP Application 22178514.0 dated Oct. 28, 2022. (9 pages).

\* cited by examiner
‡ imported from a related application

METHOD FOR PAGING, ACCESS NETWORK DEVICE, AND TERMINAL DEVICE

CROSS-REFERENCE TO RELATED APPLICATION(S)

This application a continuation of U.S. application Ser. No. 16/624,006 filed on Dec. 18, 2019, which is a 371 application of International Application No. PCT/CN2017/099352, filed on Aug. 28, 2017. The entire contents of the above-identified applications are incorporated herein by reference.

TECHNICAL FIELD

Implementations of the present application relate to the field of communication, and more particularly, relate to a method for paging, an access network device, and a terminal device.

BACKGROUND

Paging is a signaling process performed when a network searches for a terminal. The called party in the network must respond to paging to communicate normally. In a Long Term Evolution (LTE) system, paging is initiated by a core network, while in a 5G system, paging may be initiated by a Radio Access Network (RAN) to the terminal. As the 5G system requires a high communication performance, how to improve the communication performance for paging is an urgent problem to be solved.

SUMMARY

In view of the above, an implementation of the present application provides a method for paging.

In a first aspect, there is provided a method for paging. The method includes: an access network device receives movement information of a terminal device sent by the terminal device; the access network device determines, according to the movement information, a target paging area where the access network device initiates paging to the terminal device; and the access network device sends information indicating the target paging area to the terminal device.

The access network device determines a relatively suitable paging area for RAN paging by referring to the movement information of the terminal device, thus it is beneficial to reduce signaling overhead.

In a possible implementation, the movement information is movement information of the terminal device in a previous radio resource control (RRC) inactive state.

In a possible implementation, the movement information is at least one of following: a serving cell list, time information, location information, and movement speed information.

In a possible implementation, the serving cell list includes a unique cell global identifier of each serving cell on which the terminal device camps during a movement process.

In a possible implementation, the time information is used for indicating information of absolute time when the terminal device camps on each serving cell during a movement process of the terminal device in the previous RRC inactive state.

In a possible implementation, the information of the absolute time is absolute time inside the terminal device, or a time length which is relative to initial reference absolute time and is recorded when the terminal device performs cell reselection during the movement process, wherein the initial reference absolute time is absolute time configured by a network side or absolute time inside the terminal device, and the initial reference absolute time is absolute time recorded for a first time by the terminal device in the previous RRC inactive state.

In a possible implementation, the location information is used for indicating location information of the terminal device in each serving cell on which the terminal device camps during a movement process of the terminal device in the previous RRC inactive state.

In a possible implementation, the location information is at least one of the following recorded by the terminal device: a longitude, a latitude and an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

In a possible implementation, the movement speed information is used for indicating a movement speed of the terminal device in each serving cell on which the terminal device camps during a movement process of the terminal device in the previous RRC inactive state.

In a possible implementation, the movement speed information is an absolute speed.

In a possible implementation, the movement speed information is movement state information of the terminal device, and the movement state information is indicated by a quantity of cell reselections performed by the terminal device within a first time interval.

In a possible implementation, the movement information is recorded by the terminal device at a time point when the terminal device receives a command of entering the previous RRC inactive state and/or at a time point when the terminal device in the previous RRC inactive state performs cell reselection.

In a possible implementation, the movement information is sampled and recorded by the terminal device according to a preconfigured time interval.

In a possible implementation, determining, by the access network device according to the movement information, a target paging area where the access network device initiates paging to the terminal device, includes: the access network device determines all serving cells corresponding to the location information as the target paging area.

In a possible implementation, before the access network device receives the movement information sent by the terminal device, the method further includes: the access network device receives a message requesting to resume an RRC connected state sent by the terminal device, wherein the message requesting to resume the RRC connected state is used for indicating a current location update type of the terminal device, and location update types include periodic location update and cross paging area update.

In a possible implementation, the movement information is a second time interval from current location update to previous location update of the terminal device, and the message requesting to resume the RRC connected state is used for indicating that the current location update type of the terminal device is cross paging area update, and determining, by the access network device according to the movement information, the target paging area where the access network device initiates paging to the terminal device, includes: when the second time interval is less than a period for the terminal device to perform the periodic location update, the access network device increases a reference paging area, wherein the reference paging area is a previous paging area configured for the terminal device by the access network device; and the access network device determines the increased reference paging area as the target paging area.

In a possible implementation, the method further includes: when downlink data for the terminal device needs to be sent, the access network device initiates paging to the terminal device in the target paging area.

In a possible implementation, when downlink data for the terminal device needs to be sent, initiating, by the access network device, paging to the terminal device in the target paging area, includes: when the terminal device is in the RRC inactive state again and the downlink data needs to be sent, the access network device initiates the paging to the terminal device in the target paging area.

In a second aspect, there is provided a method for paging. The method includes: a terminal device sends movement information of the terminal device to an access network device; and the terminal device receives a target paging area where the access network device initiates paging to the terminal device, wherein the target paging area is determined by the access network device based on the movement information.

In a possible implementation, the movement information is movement information of the terminal device in a radio resource control (RRC) inactive state.

In a possible implementation, the movement information is at least one of following: a serving cell list, time information, location information, and movement speed information.

In a possible implementation, the serving cell list includes a unique cell global identifier of each serving cell on which the terminal device camps during a movement process.

In a possible implementation, the time information is used for indicating information of absolute time when the terminal device camps on each serving cell during a movement process of the terminal device in the previous RRC inactive state.

In a possible implementation, the information of the absolute time is absolute time inside the terminal device, or a time length which is relative to initial reference absolute time and is recorded when the terminal device performs cell reselection during the movement process, wherein the initial reference absolute time is absolute time configured by a network side or absolute time inside the terminal device, and the initial reference absolute time is absolute time recorded for a first time by the terminal device in the previous RRC inactive state.

In a possible implementation, the location information is used for indicating location information recorded when the terminal device camps on each serving cell during a movement process of the terminal device in the previous RRC inactive state.

In a possible implementation, the location information is at least one of following recorded by the terminal device: a longitude, a latitude and an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

In a possible implementation, the movement speed information is used for indicating a movement speed of the terminal device in each serving cell on which the terminal device camps during a movement process of the terminal device in the previous RRC inactive state.

In a possible implementation, the movement speed information is an absolute speed.

In a possible implementation, the movement speed information is movement state information of the terminal device, and the movement state information is indicated by a quantity of cell reselections performed by the terminal device within a first time interval.

In a possible implementation, the method further includes: the terminal device acquires the movement information.

In a possible implementation, acquiring, by the terminal device, the movement information, includes: the terminal device records the movement information at a time point when receiving a command of entering the RRC inactive state and/or at a time point when performing cell reselection in the RRC inactive state.

In a possible implementation, acquiring, by the terminal device, the movement information, includes: the terminal device records the movement information according to a preconfigured time interval.

In a possible implementation, before the terminal device sends the movement information of the terminal device to the access network device, the method further includes: the terminal device sends a message requesting to resume an RRC connected state to the access network device, wherein the message requesting to resume the RRC connected state is used for indicating a current location update type of the terminal device, and location update types include periodic location update and cross paging area update.

In a possible implementation, the movement information is a second time interval from current location update to previous location update of the terminal device, and the message requesting to resume the RRC connected state is used for indicating that the current location update type of the terminal device is cross paging area update.

In a possible implementation, the method further includes: the terminal device receives a paging message sent by the access network device when the terminal device is in the RRC inactive state again, wherein the paging message is used for indicating that downlink data for the terminal device needs to be sent.

In a third aspect, there is provided an access network device which is used for performing the method in the first aspect or any possible implementation of the first aspect described above. Specifically, the access network device includes units for implementing the method in the first aspect or any possible implementation of the first aspect described above.

In a fourth aspect, there is provided a terminal device which is used for performing the method in the second aspect or any possible implementation of the second aspect described above. Specifically, the terminal device includes units for performing the method in the above second aspect or any possible implementation of the second aspect.

In a fifth aspect, there is provided an access network device. The access network device includes a memory, a processor, an input interface, and an output interface. The memory, the processor, the input interface and the output interface are connected through a bus system. The memory is used for storing instructions, and the processor is used for executing the instructions stored in the memory to perform the method in the first aspect or any possible implementation of the above first aspect.

In a sixth aspect, there is provided a terminal device. The terminal device includes a memory, a processor, an input interface, and an output interface. The memory, the processor, the input interface and the output interface are connected through a bus system. The memory is used for storing instructions, and the processor is used for executing the instructions stored in the memory to perform the method in the second aspect or any possible implementation of the above second aspect.

In a seventh aspect, there is provided a computer storage medium for storing computer software instructions for executing the method of the first aspect or any possible implementation of the first aspect, or the method of the second aspect or any possible implementation of the second aspect. The computer software instructions include programs designed for executing the aspects.

In an eighth aspect, there is provided a computer program product containing instructions. When the instructions are run on a computer, the computer is caused to perform the method of the first aspect or any optional implementation of the first aspect, or the method of the second aspect or any optional implementation of the second aspect.

These aspects or other aspects of the present application will be more readily understood from following description of the implementations.

DETAILED DESCRIPTION

Technical solutions in implementations of the present application will be clearly and completely described below with reference to the drawings in the implementations of the present application.

It should be understood that the technical solutions of the implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) System or a future 5G system, etc.

In particular, the technical solutions of the implementations of the present application may be applied to various communication systems based on non-orthogonal multiple access technologies, such as a Sparse Code Multiple Access (SCMA) system, and a Low Density Signature (LDS) system, etc. The SCMA system and the LDS system may also be referred to as other names in the communication field. Further, the technical solutions of the implementations of the present application may be applied to multicarrier transmission systems employing non-orthogonal multiple access technologies, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, and a Filtered OFDM (F-OFDM) system, etc.

The terminal device in the implementations of the present application may refer to a user equipment (UE), an access terminal, a subscriber unit, a subscriber station, a mobile station, a mobile platform, a remote station, a remote terminal, a mobile equipment, a user terminal, a terminal, a wireless communication equipment, a user agent or a user apparatus. An access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not restricted in the implementations of the present application.

The access network device in the implementations of the present application may be a device for communicating with the terminal device, the network device may be a Base Transceiver Station (BTS) in a GSM system or CDMA system, a NodeB (NB) in a WCDMA system, or may be an Evolutional NodeB in an LTE system (eNB or eNodeB), or may be a radio controller in a scenario of a Cloud Radio Access Network (CRAN), or the network device may be a relay station, an access point, an on-board device, or a wearable device, a network device in the future 5G network or a network device in the future evolved Public Land Mobile Network (PLMN), etc., which is not restricted in implementations of the present application.

The core network device in the implementations of the present application may be a Mobility Management Entity (MME), or a Serving Gateway (S-GW), or a Packet Data Network Gateway (P-GW), etc. The implementations of the present application are not limited thereto.

Figure 1:
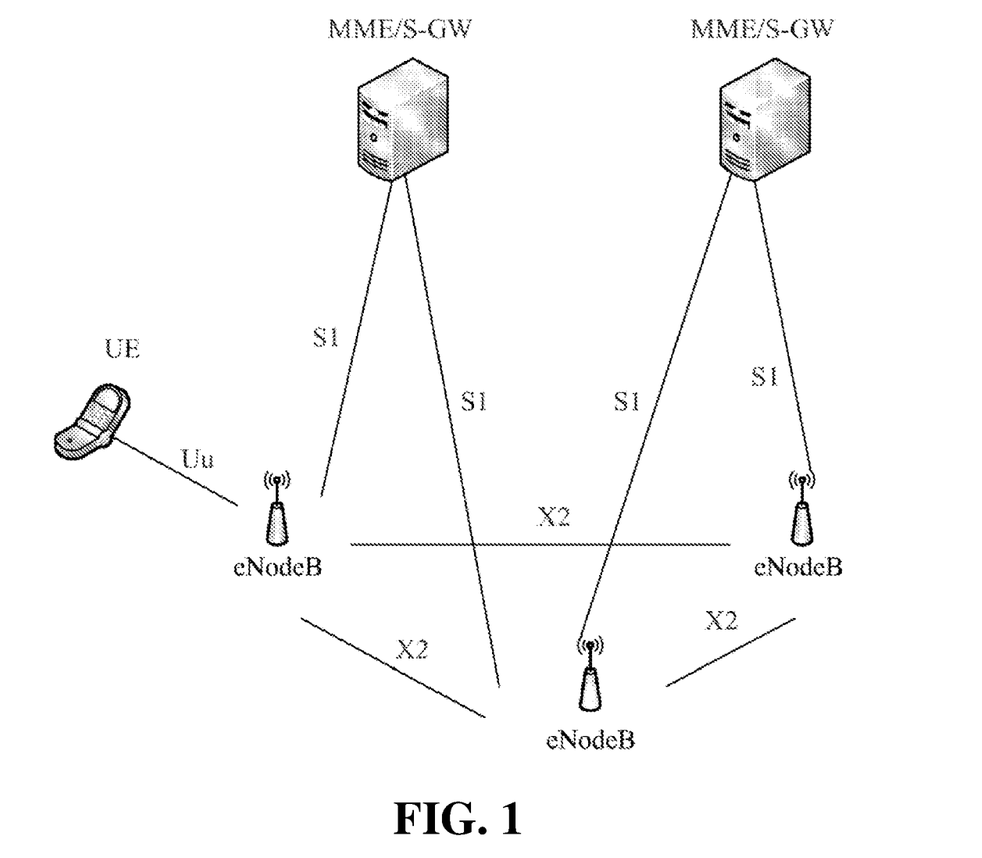
FIG. 1 illustrates a schematic diagram of an application scenario according to an implementation of the present application.

FIG. 1 is a schematic diagram of an application scenario according to an implementation of the present application. As shown in FIG. 1, LTE system architecture is divided into two parts, including MME/S-GW and eNodeB. An eNodeB is connected with a UE through a Uu interface, providing a protocol termination point to a control plane and user plane of the UE. eNodeBs are connected through an X2 interface, and there is always an X2 interface between two different eNodeBs that need to communicate. An LTE access network and a core network are connected through an S1 interface which supports a multiple-multiple connection mode.

In general, a main purpose of paging is to establish a signaling connection between a UE and an Evolved Packet Core (EPC) for subsequent signaling or data transmission. In a 5G system, when downlink data for the terminal device arrives, the terminal device may be paged through a Core Network (CN) or RAN.

Figure 2:
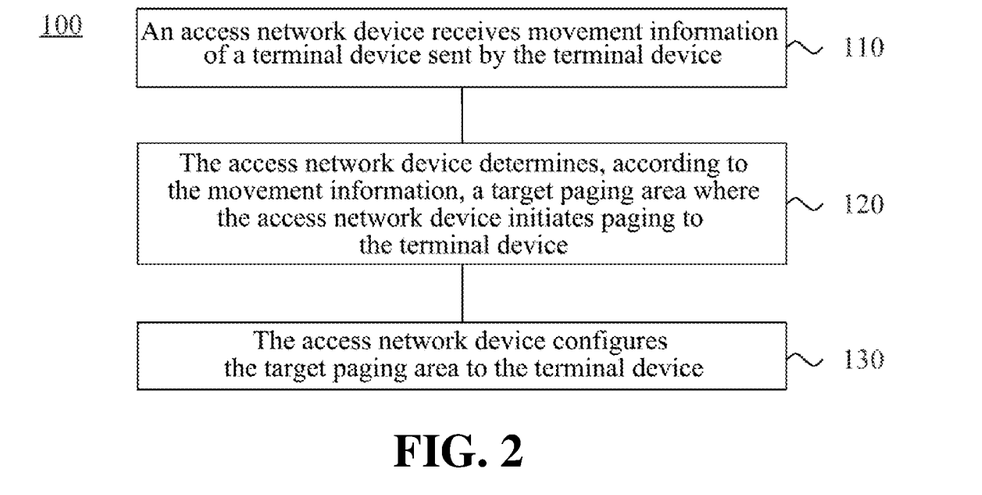
FIG. 2 illustrates a schematic block diagram of a method for paging according to an implementation of the present application.

FIG. 2 illustrates a schematic block diagram of a method 100 for paging according to an implementation of the present application. As shown in FIG. 2, the method 100 includes some or all of following contents.

In S110, an access network device receives movement information of a terminal device sent by the terminal device.

In S120, the access network device determines, according to the movement information, a target paging area where the access network device initiates paging to the terminal device.

In S130, the access network device configures the target paging area to the terminal device.

For RAN paging, the access network device firstly needs to determine a RAN paging area for the terminal device. When the terminal device moves in the paging area, the terminal device may not notify the network side, and the terminal device may directly perform cell reselection in the RAN paging area. When the terminal device moves out of the paging area, the terminal device needs to trigger the access network device to reconfigure a new RAN paging area for the terminal device. Therefore, when the RAN paging area is configured too small, the terminal device will perform location area update frequently, that is, the terminal device will frequently trigger the access network device to reconfigure a new RAN paging area for the terminal device, which causes increased UE power consumption and air interface signaling load. When the paging area is configured too large, the signaling load for configuring the RAN paging area will increase, and the paging signaling will also increase.

Specifically, the movement information of the terminal device may be any information of the terminal device during a movement process, for example, it may be a movement speed, information of each cell during the movement process, or information of cell handover during the movement process, etc. The access network device may receive the movement information of the terminal device acquired by the terminal device, for example, the access network device may receive the movement information sent by the terminal device when the terminal device is in a connected state. The access network device may determine the paging area for RAN paging according to the received movement information, and then when the access network device needs to send information to the terminal device in a disconnected state, the access network device may directly initiate the RAN paging to the terminal device in the determined paging area.

Therefore, in the method for paging according to the implementation of the present application, the access network device may refer to the movement information of the terminal device to determine a relatively suitable paging area for RAN paging, thereby it is beneficial to reducing signaling overhead.

Optionally, in the implementation of the present application, the movement information is movement information of the terminal device in a previous Radio Resource Control (RRC) inactive state.

Figure 3:
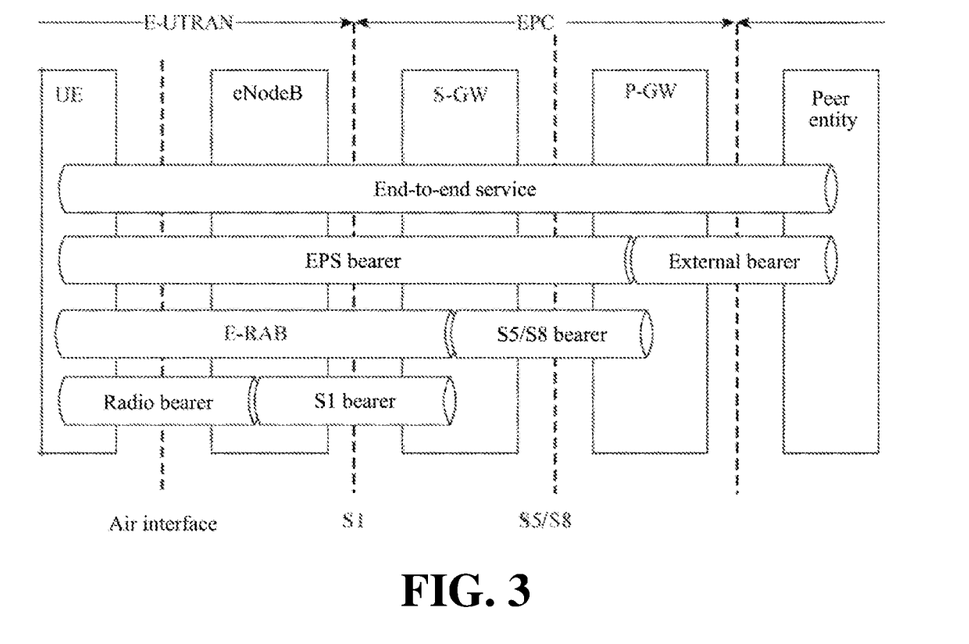
FIG. 3 illustrates a schematic block diagram of an EPS bearer service architecture.

To facilitate the understanding of the implementation of the present application, first of all, some elements in an Evolved Packet System (EPS) bearer service architecture are briefly described with reference to FIG. 3. As shown in FIG. 3, the network architecture mainly includes an Evolved-Universal Mobile Telecommunication System Terrestrial Radio Access Network (E-UTRAN) and an Evolved Packet Core (EPC) network. In the EPS bearer service architecture system, an end-to-end service may be divided into two parts, i.e., EPS bearer and external bearer. Herein, one Evolved Radio Access Bearer (E-RAB) is used for transmitting a packet of one EPS bearer between the UE and the evolved EPC, and there is a one-to-one correspondence between the E-RAB and EPS bearer. One radio bearer is used for transmitting a packet of one E-RAB bearer between the UE and the eNodeB, and there is a one-to-one correspondence between the radio bearer and the E-RAB/EPS bearer. One S1 bearer is used for transmitting a packet of one E-RAB bearer between the eNodeB and the S-GW. One S5/S8 bearer is used for transmitting a packet of one EPS bearer between the S-GW and the P-GW.

In the LTE system, RRC states of the UE mainly include an RRC idle state and an RRC connected state. Herein, for the RRC idle state, there is an S5/S8 bearer, no radio bearer or S1 bearer, a core network side retains UE context, the eNodeB does not retain UE context, and the UE does not retain eNodeB context, the terminal retains a unique identifier (which is usually referred to as Temporary Mobile Subscriber Identity (TMSI)) in Time advance (TA). The UE in the RRC idle state cannot have data interchange with a network, a Discontinuous Reception (DRX) process configured by a Non-access stratum (NAS), system information broadcasting and paging, neighboring cell measurement, mobility of cell reselection, and cannot perform a behavior of reporting of a measurement report. For the RRC connected state, there are an S5/S8 bearer, an S1 bearer and a radio bearer, and the core network, the eNodeB and the UE all retain corresponding contexts, and the eNodeB allocates an access stratum (AS) identifier (which is usually referred to as Cell Radio Network Temporary Identifier (C-RNTI)). The UE in the RRC connected state may interchange data with the network, may perform behaviors such as DRX configured by the AS, mobility of handover, and reporting channel measurement to the network side.

In the 5G system, a third state, i.e., RRC inactive state, is introduced. For the RRC Inactive State, there are an S5/S8 Bearer, an S1 Bearer and part of Radio Bearers, and the core Network, the eNodeB and the UE all retain corresponding contexts, and the eNodeB allocates an access stratum (AS) identifier (which is usually referred to as a Resume identifier (ID)). The UE in the RRC inactive state has mobility of cell reselection, does not perform measurement reporting, may send and receive small data, and may have DRX configured by the AS.

In general, paging of the terminal device in the RRC idle state may be initiated by a CN, and a paging area is also configured by the CN, while paging of the terminal device in the RRC inactive state may be initiated by an RAN, and a paging area may be configured by the RAN. However, the implementations of the present application are not limited thereto. For example, paging of the terminal device in the RRC idle state may be initiated by the RAN.

Specifically, the access network device may refer to movement information of the terminal device in the previous RRC inactive state to determine a paging area where the access network device initiates paging to the terminal device when the terminal device enters the inactive state again. The access network device may refer to the movement information of the terminal device in any state to determine a paging area for RAN paging, and the paging area may be used for initiating paging to the terminal device in an idle state or inactive state. For example, the access network device may refer to the movement information of the terminal device in a previous idle state or several previous idle states to determine the paging area for initiating RAN paging to the terminal device that is in the idle state again. It should be understood that the aforementioned "previous", the source of the movement information of the terminal device and the purpose of the determined target paging area are all for illustrative description, and the implementations of the present application are not limited thereto.

Optionally, in an implementation of the present application, the method further includes: when downlink data of the terminal device needs to be sent, the access network device initiates paging to the terminal device in the target paging area.

Those skilled in the art will understand that paging may be triggered by data, or changing of a cell system message, etc. In general, the paging we discuss mainly refers to paging triggered by data. Specifically, when the access network device knows that there is downlink data to be transmitted, the access network device may directly initiate paging to a corresponding terminal device in the determined target paging area. For example, when downlink data arrives at the access network device, the access network device may send a paging message to a corresponding terminal device, and an identifier of the terminal device may be carried in the paging message. For another example, when downlink data arrives at the core network device, the core network device temporarily does not send the downlink data to the access network device, but may send to the access network device an indication message indicating that downlink data for the terminal device needs to be transmitted, and the access network device may send a paging message to the terminal device after receiving the indication message. The implementations of the present application do not limit conditions for triggering the access network device to initiate paging.

Optionally, in an implementation of the present application, when downlink data for the terminal device needs to be sent, initiating, by the access network device, paging to the terminal device in the target paging area, includes: when the terminal device is in the RRC inactive state again and downlink data needs to be sent, the access network device initiates the paging to the terminal device in the target paging area.

Optionally, the access network device may directly initiate paging to the terminal device in the determined target paging area when the terminal device is in the RRC idle state and downlink data needs to be sent. The access network device may also directly initiate paging to the terminal device in the target paging area when a system message needs to be sent to the terminal device.

Optionally, in an implementation of the application, the movement information is at least one of following: a time set, a location set, a speed set, a movement speed of the terminal device, a quantity of cell reselections of the terminal device within a first time interval, and a second time interval between two most recent location updates of the terminal device. The time set is used for indicating time when the terminal device camps on each serving cell during a movement process. The location set is used for indicating each serving cell of the terminal device during the movement process. The speed set is used for indicating a movement speed of the terminal device in each serving cell during the movement process.

It should be understood that the above various movement information is for illustrative description only, and the implementations of the present application are not limited thereto. Implementations of the present application will be described in detail below in conjunction with the above various movement information.

Optionally, in an implementation of the present application, the movement information is a location set. The location set is used for indicating each serving cell of the terminal device in the RRC inactive state during the movement process. Configuring, by the access network device for the terminal device according to the movement information, the target paging area where the access network device initiates paging to the terminal device includes: the access network device determines a serving cell corresponding to each location in the location set as the target paging area.

Specifically, when the terminal device in the RRC inactive state is located in a new cell every time, it may record information of the cell. For example, the terminal device may record a serving cell where the terminal device is located at a time point when the terminal device enters the RRC inactive state from the RRC connected state, or may record a serving cell where the terminal device is located at a time point when the terminal device in the inactive state performs cell reselection every time.

Optionally, the location set in the implementation of the present application may include locations corresponding to a plurality of cells one by one, wherein the location may be a precise location, i.e., a longitude, a latitude or an altitude, etc., or the location may be an identifier of a serving cell where the terminal device is located, for example, a globally unique cell identification of the serving cell where the terminal device is located. The location may be other information indicating the location, such as fingerprint location information, that is, measurement information of at least one neighboring cell, and the fingerprint location information is specifically measurement information of neighboring cells, and the quantity of the neighboring cells depends on network implementation. Optionally, there may be one serving cell corresponding to a plurality of locations in the location set. For example, the terminal device in the RRC inactive state may periodically record the location of the terminal device. For example, after entering the RRC inactive state, the terminal device may record the location of the terminal device every 10 s until the terminal device enters a connected state, then the terminal device may acquire multiple locations, and several of the multiple locations may be in a same serving cell.

For example, if the location of the terminal device is fixed, the access network device will configure only one cell for the terminal device as a paging area. In this case, when the downlink data for the terminal device arrives, the access network device sends a Physical Downlink Control Channel (PDCCH) order to configure a special random access resource to the terminal device to quickly resume the connection and receive data. If the terminal device moves only in several cells in the movement information reported by the terminal device, then the several cells on which the terminal device camps are configured as the paging area of the terminal device.

Optionally, in an implementation of the present application, the movement information is a speed set, and the speed set is used for indicating a movement speed of the terminal device in the RRC inactive state in each serving cell during the movement process. Configuring, by the access network device for the terminal device according to the movement information, the target paging area where the access network device initiates paging to the terminal device, includes: the access network device determines a serving cell corresponding to a speed smaller than a first threshold in the speed set as the target paging area.

The speed information may be an absolute speed at a certain time point after the terminal device enters a certain serving cell, or may be an average speed of the terminal device in a certain serving cell, or may be any information that may indicate the speed of the terminal device in a certain serving cell. The implementations of the present application are not limited thereto. The terminal device may record a current speed of the terminal device when the terminal device enters each cell, or the terminal device may record a current speed of the terminal device at a certain time point after entering each cell, or the terminal device may record speeds at multiple time points (a time interval between the multiple time points may be preconfigured by the network device) after entering each cell, and report an average value at the multiple time points to the access network device. The network device may directly determine the target paging area from the serving cells corresponding to the multiple speeds reported by the terminal device. For example, the network device may configure a threshold value for the speed, such as 5 m/s, then the terminal device may sequentially determine whether the speed in each cell is within the threshold value and determine a cell within the threshold value as the target paging area.

Optionally, in an implementation of the present application, the movement information is a time set, and the time set is used for indicating time when the terminal device in the RRC inactive state camps on each serving cell during the movement process. Configuring, by the access network device for the terminal device according to the movement information, the target paging area where the access network device initiates paging to the terminal device, includes: the access network device determines a serving cell corresponding to a time interval greater than a second threshold in the time set as the target paging area.

The time may be information of absolute time when the terminal device camps on each serving cell during a movement process of the terminal device in the previous RRC inactive state. For example, the time may be a time point when the terminal device enters the previous inactive state and/or a time point when the terminal device in the previous inactive state performs cell reselection every time. The information of the absolute time is absolute time inside the terminal device, or a time length which is relative to initial reference absolute time and is recorded when the terminal device performs cell reselection during the movement process, wherein the initial reference absolute time is absolute time configured by a network side or absolute time inside the terminal device, and the initial reference absolute time is absolute time recorded for a first time by the terminal device in the previous RRC inactive state. It should be understood that the initial reference absolute time may otherwise be the absolute time recorded previously before the current recording. Implementations of the present application are not limited thereto.

For example, the network device may determine the time when the terminal device in the RRC inactive state camps on each cell according to multiple pieces of time in the time set, and the network device may directly determine the serving cell on which the terminal device camps for long time as the target paging area. For example, the network device configures a threshold for the determination.

Optionally, in an implementation of the present application, the movement information may be directly a movement speed of the terminal device during the whole process of the previous RRC inactive state, for example, the movement speed may be an absolute movement speed or an average movement speed during the whole process. The movement speed may be indicated by movement state information, for example, the movement state of the terminal device may be indicated as a high speed, low speed or normal speed through a quantity of cell reselections performed by the terminal device within specified time. Any information that may indicate the speed may be used as the movement speed information reported by the terminal device in the implementations of the present application.

Specifically, the network device may configure a threshold value to compare the speed reported by the terminal device with the threshold value. If the speed reported by the terminal device is greater than the threshold value, the network device may suitably increase the paging area on the basis of the previous paging area. If the speed reported is less than the threshold value, the network device may also suitably reduce the paging area on the basis of the previous paging area. It should be understood that how the network device determines the target paging area according to the speed reported by the terminal device depends on network implementation, and the implementations of the present application do not restrict it.

Optionally, in an implementation of the present application, the movement information is recorded by the terminal device at a time point when the terminal device receives a command of entering the previous RRC inactive state and/or at a time point when the terminal device in the previous RRC inactive state performs cell reselection.

Optionally, in the implementation of the present application, the movement information is sampled and recorded by the terminal device according to a preconfigured time interval.

As described above, at a time point when the terminal device enters the RRC inactive state, the terminal device records a current serving cell where the terminal device is located, a current time point, a current speed and a current location, and at a time point when the terminal device in the RRC inactive state performs each cell reselection, the terminal device records a current serving cell where the terminal device is located, a current time point, a current speed and a current location. The terminal device may periodically sample and record the serving cell where the terminal device is located, the time, the speed and the location according to the time interval preconfigured by the network device when the terminal device is in the RRC inactive state.

Optionally, in an implementation of the present application, before the access network device receives the movement information sent by the terminal device, the method further includes: the access network device receives a message requesting to resume an RRC connected state sent by the terminal device, wherein the message requesting to resume the RRC connected state is used for indicating a current location update type of the terminal device, and location update types include periodic location update and cross paging area update.

Optionally, in an implementation of the present application, the movement information is a second time interval between current location update and previous location update of the terminal device, and the message requesting to resume the RRC connected state is used for indicating that the current location update type of the terminal device is cross paging area update, and determining, by the access network device according to the movement information, the target paging area where the access network device initiates paging to the terminal device, includes: if the second time interval is less than a period for the terminal device to perform periodic location update, the access network device increases a reference paging area which is a previous paging area configured for the terminal device by the access network device; and the access network device determines the increased reference paging area as the target paging area.

Specifically, when the terminal device performs location update, the terminal device in the RRC inactive state may send a message requesting to resume an RRC connected state to the access network device, and the terminal device may carry a current location update type in the message, for example, a bit may be added into the message requesting to resume the RRC connected state, wherein 0 indicates a periodic location update type and 1 indicates a cross paging area update type. If it is the cross paging area update, the movement information may be reported, and the movement information may be a relative time length from a most recent location area update. The network device may further determine whether the paging area previously configured for the terminal device is suitable according to comparison between the relative time length reported by the terminal device and the period of the periodic location update. For example, if a time interval between cross paging area location update currently performed and previous location update is less than the period of the periodic location update, then it indicates that the previous paging area configured by the network device to the terminal device is not suitable and relatively small, so the previous paging area should be increased.

Optionally, if a current access network device 1 is not an access network device that stores access network context of the terminal device, and the access network context of the terminal device is stored in an access network device 2, then when the access network device 1 acquires the access network context of the terminal device from the access network device 2, the access network device 2 also sends most recent paging area information of the terminal device to the access network device 1.

Figure 4:
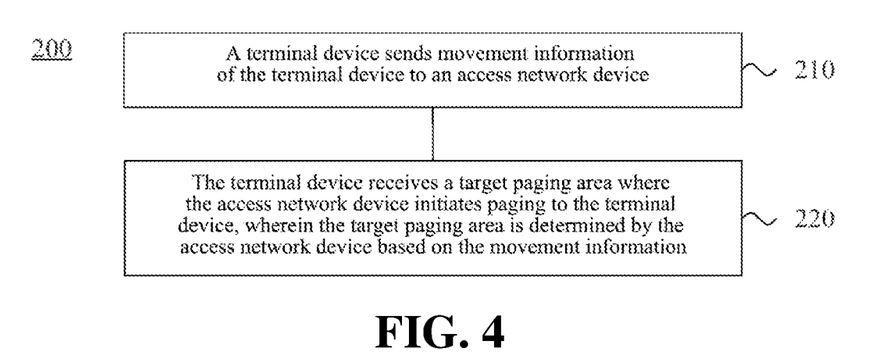
FIG. 4 illustrates another schematic block diagram of a method for paging according to an implementation of the present application.

FIG. 4 illustrates a schematic block diagram of a method 200 for paging according to an implementation of the present application. As shown in FIG. 4, the method 200 includes some or all of following contents.

In S210, a terminal device sends movement information of the terminal device to an access network device.

In S220, the terminal device receives a target paging area where the access network device initiates paging to the terminal device, wherein the target paging area is determined by the access network device based on the movement information.

Therefore, in the method for paging according to the implementation of the present application, the access network device can determine a relatively suitable paging area for RAN paging according to the movement information reported by the terminal device, thereby it is beneficial to reduce signaling overhead.

Optionally, in an implementation of the present application, the movement information is movement information of the terminal device in a radio resource control (RRC) inactive state.

Optionally, in an implementation of the present application, the movement information is at least one of following: a serving cell list, time information, location information, and movement speed information.

Optionally, in an implementation of the present application, the serving cell list includes a unique cell global identifier of each serving cell on which the terminal device camps during a movement process.

Optionally, in an implementation of the present application, the time information is used for indicating information of absolute time when the terminal device camps on each serving cell during a movement process of the terminal device in a previous RRC inactive state.

Optionally, in an implementation of the present application, the information of the absolute time is absolute time inside the terminal device, or a time length which is relative to initial reference absolute time and is recorded when the terminal device performs a cell reselection during the movement process, wherein the initial reference absolute time is absolute time configured by a network side or absolute time inside the terminal device, and the initial reference absolute time is absolute time recorded for a first time by the terminal device in the previous RRC inactive state.

Optionally, in an implementation of the present application, the location information is used for indicating location information recorded when the terminal device camps on each serving cell during a movement process of the terminal device in the previous inactive state.

Optionally, in an implementation of the present application, the location information is at least one of following recorded by the terminal device: a longitude, a latitude and an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

Optionally, in an implementation of the present application, the movement speed information is used for indicating a movement speed of the terminal device in each serving cell on which the terminal device camps during a movement process of the terminal device in the previous inactive state.

Optionally, in an implementation of the present application, the movement speed information is an absolute speed.

Optionally, in an implementation of the present application, the movement speed information is movement state information of the terminal device, and the movement state information is indicated by a quantity of cell reselections performed by the terminal device in a first time interval.

Optionally, in an implementation of the present application, the method further includes: the terminal device acquires the movement information.

Optionally, in an implementation of the present application, acquiring, by the terminal device, the movement information, includes: the terminal device records the movement information at a time point when receiving a command of entering the RRC inactive state and/or at a time point when performing cell reselection in the RRC inactive state.

Optionally, in an implementation of the present application, acquiring, by the terminal device, the movement information, includes: the terminal device records the movement information according to a preconfigured time interval.

Optionally, in an implementation of the present application, before the terminal device sends the movement information of the terminal device to the access network device, the method further includes: the terminal device sends a message requesting to resume an RRC connected state to the access network device, wherein the message requesting to resume the RRC connected state is used for indicating a current location update type of the terminal device, and location update types include periodic location update and cross paging area update.

Optionally, in an implementation of the present application, the movement information is a second time interval between current location update and previous location update of the terminal device, and the message requesting to resume RRC connected state is used for indicating that the current location update type of the terminal device is cross paging area update.

Optionally, in an implementation of the present application, the method further includes: the terminal device receives a paging message sent by the access network device when the terminal device is in the RRC inactive state again, wherein the paging message is used for indicating that downlink data for the terminal device needs to be sent.

It should be understood that the interaction between the terminal device and the network device and the related characteristics and functions, etc. described for the terminal device correspond to the related characteristics and functions of the access network device. That is, which information the terminal device sends to the access network device will be received by the access network device accordingly. For sake of conciseness, the specific description will not be repeated here.

It should be understood that in various implementations of the present invention, values of sequence numbers in the processes described above do not indicate an order of execution, and the order of execution of various processes should be determined by their functions and internal logics, and should not constitute any limitation on implementation processes of implementations of the present application.

Methods for paging according to implementations of the present application have been described in detail above. Devices for paging according to implementations of the present application will be described below with reference to FIGS. 5 to 8. Technical features described in the method implementations are applicable to the following device implementations.

Figure 5:
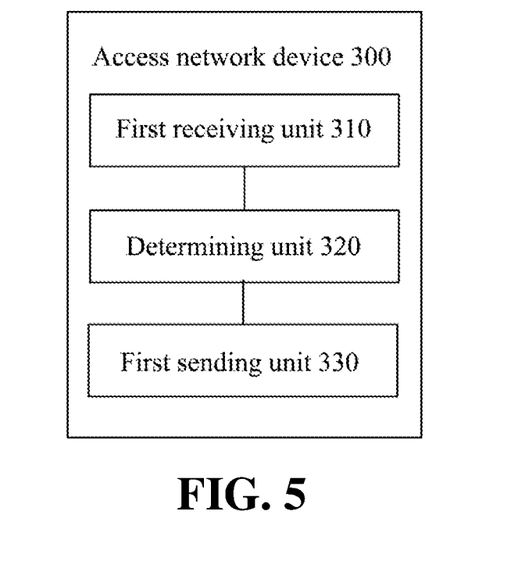
FIG. 5 illustrates a schematic block diagram of an access network device according to an implementation of the present application.

FIG. 5 illustrates a schematic block diagram of an access network device 300 according to an implementation of the present application. As shown in FIG. 5, the access network device 300 includes a first receiving unit 310, a determining unit 320 and a first sending unit 330.

The first receiving unit 310 is used for receiving movement information of a terminal device sent by the terminal device.

The determining unit 320 is used for determining, according to the movement information, a target paging area where the access network device initiates paging to the terminal device.

The first sending unit 330 is used for sending the target paging area to the terminal device.

Therefore, the access network device according to the implementation of the present application may refer to the movement information of the terminal device to determine a relatively suitable paging area for RAN paging, thereby it is beneficial to reduce signaling overhead.

Optionally, in an implementation of the present application, the movement information is movement information of the terminal device in a previous radio resource control (RRC) inactive state.

Optionally, in an implementation of the present application, the movement information is at least one of following: a serving cell list, time information, location information, and movement speed information.

Optionally, in an implementation of the present application, the serving cell list includes a unique cell global identifier of each serving cell on which the terminal device camps during a movement process.

Optionally, in an implementation of the present application, the time information is used for indicating information of absolute time when the terminal device camps on each serving cell during a movement process of the terminal device in the previous RRC inactive state.

Optionally, in an implementation of the present application, the information of the absolute time is absolute time inside the terminal device, or a time length which is relative to initial reference absolute time and is recorded when the terminal device performs a cell reselection during the movement process, wherein the initial reference absolute time is absolute time configured by a network side or absolute time inside the terminal device, and the initial reference absolute time is absolute time recorded for a first time by the terminal device in the previous RRC inactive state.

Optionally, in an implementation of the present application, the location information is used for indicating location information of the terminal device in each serving cell on which the terminal device camps during a movement process of the terminal device in the previous RRC inactive state.

Optionally, in an implementation of the present application, the location information is at least one of following recorded by the terminal device: a longitude, a latitude and an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

Optionally, in an implementation of the present application, the movement speed information is used for indicating a movement speed of the terminal device in each serving cell on which the terminal device camps during a movement process in which the terminal device is in the previous RRC inactive state.

Optionally, in an implementation of the present application, the movement speed information is an absolute speed.

Optionally, in an implementation of the present application, the movement speed information is movement state information of the terminal device, and the movement state information is indicated by a quantity of cell reselections performed by the terminal device in a first time interval.

Optionally, in an implementation of the present application, the movement information is recorded by the terminal device at a time point when the terminal device receives a command of entering the previous RRC inactive state and/or at a time point when the terminal device performs cell reselection in the previous RRC inactive state.

Optionally, in an implementation of the present application, the movement information is sampled and recorded by the terminal device according to a preconfigured time interval.

Optionally, in an implementation of the present application, the determining unit is specifically used for determining all serving cells corresponding to the location information as the target paging area.

Optionally, in an implementation of the present application, the access network device further includes a second receiving unit, used for receiving a message requesting to resume an RRC connected state sent by the terminal device, wherein the message requesting to resume the RRC connected state is used for indicating a current location update type of the terminal device, and location update types include periodic location update and cross paging area update.

Optionally, in an implementation of the present application, the movement information is a second time interval between current location update and previous location update of the terminal device, and the message requesting to resume the RRC connected state is used for indicating that the current location update type of the terminal device is cross paging area update, and the determining unit is specifically used for, if the second time interval is less than a period for the terminal device to perform the periodic location update, the access network device increases a reference paging area, which is a previous paging area configured for the terminal device by the access network device; and the access network device determines the increased reference paging area as the target paging area.

Optionally, in an implementation of the present application, the access network device further includes a second sending unit, used for initiating paging to the terminal device in the target paging area when downlink data for the terminal device needs to be sent.

Optionally, in an implementation of the present application, the second sending unit is specifically used for initiating the paging to the terminal device in the target paging area when the terminal device is in the RRC inactive state again and downlink data needs to be sent.

It should be understood that the access network device 300 according to the implementation of the present application may correspond to the access network device in the method implementations of the present application, and the above and other operations and/or functions of various units in the access network device 300 are respectively to realize the corresponding processes of the access network device in the method shown in FIG. 2, and will not be repeated here for the sake of brevity.

Figure 6:
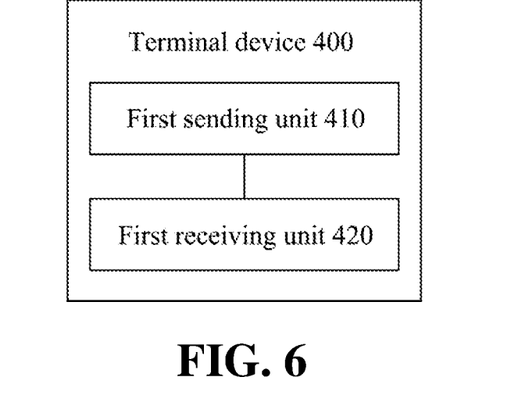
FIG. 6 illustrates a schematic block diagram of a terminal device according to an implementation of the present application.

FIG. 6 illustrates a block diagram of a terminal device 400 according to an implementation of the present application. As shown in FIG. 6, the terminal device 400 includes a first sending unit 410 and a first receiving unit 420.

The first sending unit 410 is used for sending movement information of the terminal device to an access network device.

The first receiving unit is used for receiving a target paging area where the access network device initiates paging to the terminal device, wherein the target paging area is determined by the access network device based on the movement information.

Therefore, the terminal device reports the movement information according to the implementation of the present application to enable the access network device to determine a relatively suitable paging area for RAN paging, thereby it is beneficial to reducing signaling overhead.

Optionally, in an implementation of the present application, the movement information is movement information of the terminal device in a radio resource control (RRC) inactive state.

Optionally, in an implementation of the present application, the movement information is at least one of following: a serving cell list, time information, location information, and movement speed information.

Optionally, in an implementation of the present application, the serving cell list includes a unique cell global identifier of each serving cell on which the terminal device camps during a movement process.

Optionally, in an implementation of the present application, the time information is used for indicating information of absolute time when the terminal device camps on each serving cell during a movement process of the terminal device in the previous RRC inactive state.

Optionally, in an implementation of the present application, the information of the absolute time is absolute time inside the terminal device, or a time length which is relative to initial reference absolute time and is recorded when the terminal device performs cell reselection during the movement process, wherein the initial reference absolute time is absolute time configured by a network side or absolute time inside the terminal device, and the initial reference absolute time is absolute time recorded for a first time by the terminal device in the previous RRC inactive state.

Optionally, in an implementation of the present application, the location information is used for indicating location information recorded when the terminal device camps on each serving cell during a movement process of the terminal device in the RRC inactive state.

Optionally, in an implementation of the present application, the location information is at least one of following recorded by the terminal device: a longitude, a latitude and an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

Optionally, in an implementation of the present application, the movement speed information is used for indicating a movement speed of the terminal device in each serving cell on which the terminal device camps during a movement process of the terminal device in the previous RRC inactive state.

Optionally, in an implementation of the present application, the movement speed information is an absolute speed.

Optionally, in an implementation of the present application, the movement speed information is movement state information of the terminal device, and the movement state information is indicated by a quantity of cell reselections performed by the terminal device in a first time interval.

Optionally, in an implementation of the present application, the terminal device further includes an acquisition unit used for acquiring the movement information.

Optionally, in an implementation of the present application, the acquisition unit is specifically used for recording the movement information at a time point when a command of entering the RRC inactive state is received and/or at a time point when the terminal device in the RRC inactive state performs cell reselection.

Optionally, in an implementation of the present application, the acquisition unit is specifically used for recording the movement information according to a preconfigured time interval.

Optionally, in an implementation of the present application, the terminal device further includes a second sending unit used for sending a message requesting to resume an RRC connected state to the access network device, wherein the message requesting to resume the RRC connected state is used for indicating a current location update type of the terminal device, and location update types include periodic location update and cross paging area update.

Optionally, in an implementation of the present application, the movement information is a second time interval between current location update and previous location update of the terminal device, and the message requesting to resume RRC connected state is used for indicating that the current location update type of the terminal device is cross paging area update.

Optionally, in an implementation of the present application, the terminal device further includes a second receiving unit used for receiving a paging message sent by the access network device when the terminal device is in the RRC inactive state again, wherein the paging message is used for indicating that downlink data for the terminal device needs to be sent.

It should be understood that the terminal device 400 according to the implementation of the present application may correspond to the terminal device in the method implementations of the present application, and the above operations and other operations and/or functions of various units in the terminal device 400 are respectively for realizing the corresponding processes of the terminal device in the method shown in FIG. 4, and will not be repeated here for brevity.

Figure 7:
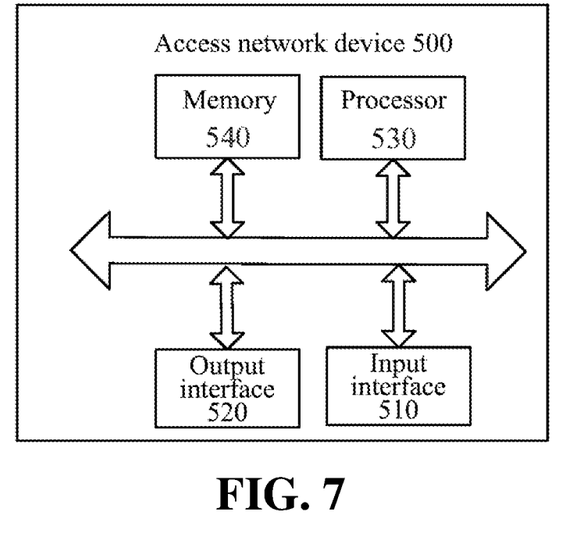
FIG. 7 illustrates another schematic block diagram of an access network device according to an implementation of the present application.

As shown in FIG. 7, an implementation of the present application further provides an access network device 500, which may be the access network device 300 in FIG. 5, and can be used for executing the operations of the access network device corresponding to the method 100 in FIG. 2. The access network device 500 includes an input interface 510, an output interface 520, a processor 530, and a memory 540. The input interface 510, the output interface 520, the processor 530, and the memory 540 may be connected through a bus system. The memory 540 is used for storing programs, instructions, or codes. The processor 530 is used for executing the programs, the instructions, or the codes in the memory 540 to control the input interface 510 to receive signals, to control the output interface 520 to send signals, and to complete the operations in the above method implementations.

Therefore, the access network device according to the implementation of the present application may refer to the movement information of the terminal device to determine a relatively suitable paging area for RAN paging, thereby it is beneficial to reducing signaling overhead.

It should be understood that, in the implementation of the present application, the processor 530 may be a central processing unit (CPU), or the processor 530 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor or the processor may be any conventional processor, or the like.

The memory 540 may include a read-only memory and a random access memory, and provide instructions and data to the processor 530. A portion of memory 540 may include a non-volatile random access memory. For example, the memory 540 may store device type information.

In implementation processes, various acts of the methods described above may be accomplished by integrated logic circuits of hardware or instructions in the form of software in the processor 530. The acts of the method disclosed in connection with the implementations of the present application may be directly embodied to be accomplished by execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 540, and the processor 530 reads the information in the memory 540, and accomplishes the contents of the above method in combination with its hardware. In order to avoid repetition, it will not be described in detail here.

In a specific implementation, the paging unit, the first sending unit and the second sending unit of the access network device 300 may be implemented by the output interface 520 in FIG. 7, and the determining unit of the access network device 300 may be implemented by the processor 530 in FIG. 7. The first receiving unit and the second receiving unit of the access network device 300 may be implemented by the input interface 510 in FIG. 7.

Figure 8:
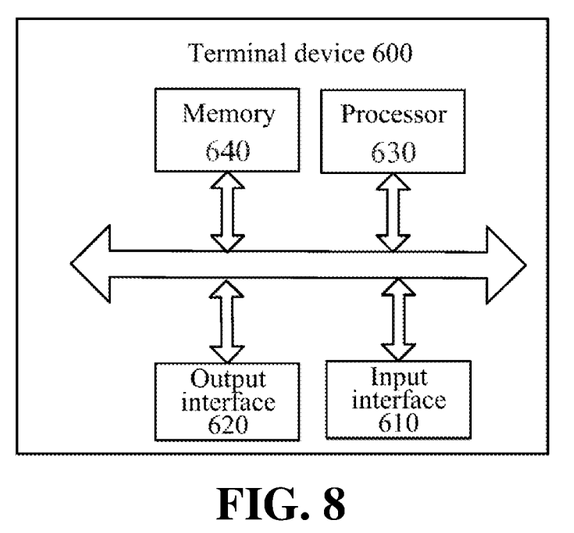
FIG. 8 illustrates another schematic block diagram of a terminal device according to an implementation of the present application.

As shown in FIG. 8, an implementation of the present application further provides a terminal device 600, which may be the device 400 in FIG. 6 and can be used for executing the operations of the terminal device corresponding to the method 200 in FIG. 4. The terminal device 600 includes an input interface 610, an output interface 620, a processor 630, and a memory 640. The input interface 610, the output interface 620, the processor 630, and the memory 640 may be connected through a bus system. The memory 640 is used for storing programs, instructions, or codes. The processor 630 is used for executing the programs, the instructions, or the codes in the memory 640 to control the input interface 610 to receive signals, to control the output interface 620 to send signals, and to complete the operations in the above method implementations.

Therefore, the terminal device according to the implementation of the present application reports the movement information to enable the access network device to determine a relatively suitable paging area for RAN paging according to the movement information, thereby it is beneficial to reducing signaling overhead.

It should be understood that, in an implementation of the present application, the processor 630 may be a central processing unit (CPU), or the processor 630 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor or the processor may be any conventional processor, or the like.

The memory 640 may include a read-only memory and a random access memory, and provide instructions and data to the processor 630. A portion of memory 640 may include a non-volatile random access memory. For example, the memory 640 may store device type information.

In implementation processes, various acts of the methods described above may be accomplished by integrated logic circuits of hardware or instructions in the form of software in the processor 630. The acts of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 640, and the processor 630 reads the information in the memory 640, and accomplishes the contents of the above method in combination with its hardware. In order to avoid repetition, it will not be described in detail here.

In a specific implementation, each sending unit of the terminal device 400 may be implemented by the output interface 620 in FIG. 8, and each receiving unit of the terminal device 400 may be implemented by the input interface 610 in FIG. 8. The acquisition unit of the terminal device 400 may be implemented by the processor 630 in FIG. 8.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present application.

Those skilled in the art may clearly understand that for convenience and conciseness of description, the specific working process of the system, device and unit described above may refer to the corresponding process in the aforementioned implementations of methods, and details are not described herein again.

In several implementations provided by the present application, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present application may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of various implementations of the present application. The aforementioned storage medium includes various media capable of storing program codes, such as a U disk, a mobile hard disk, a read-only memory (ROM), a random access memory (RAM), a magnetic disk, or an optical disk.

The foregoing are merely exemplary implementations of the present application, but the protection scope of the present application is not limited thereto. Any person skilled in the art may easily conceive variations or substitutions within the technical scope disclosed by the present application, which should be included within the protection scope of the present application. Therefore, the protection scope of the present application should be subject to the protection scope of the claims.

What is claimed is:

1. A method for paging, comprising:
sending, by a terminal device, movement information of the terminal device to an access network device; wherein the movement information is movement information of the terminal device in a radio resource control (RRC) inactive state; and
receiving, by the terminal device, a target paging area where the access network device initiates paging to the terminal device, wherein the target paging area is determined by the access network device; wherein the movement information comprises time information, and the time information is used for indicating duration of stay in each serving cell.

2. The method according to claim 1, wherein the movement information further comprises at least one of: a serving cell list, or location information.

3. The method according to claim 1, wherein the movement information is: movement speed information.

4. The method according to claim 2, wherein the serving cell list comprises a unique cell global identifier of each serving cell on which the terminal device camps during a movement process.

5. The method according to claim 2, wherein the location information is used for indicating location information recorded when the terminal device camps on each serving cell during a movement process of the terminal device in a previous RRC inactive state.

6. The method according to claim 5, wherein the location information is at least one of following recorded by the terminal device: a longitude, a latitude or an altitude; or, the location information is measurement information, recorded by the terminal device, of at least one neighboring cell of the serving cell where the terminal device is located; or, the location information is a unique cell global identifier, recorded by the terminal device, of the serving cell where the terminal device is located.

7. The method according to claim 2, wherein the movement speed information is used for indicating a movement speed of the terminal device in each serving cell on which the terminal device camps during a movement process of the terminal device in a previous RRC inactive state.

8. The method according to claim 2, wherein the movement speed information is movement state information of the terminal device, and the movement state information is indicated by number of cell reselections performed by the terminal device within a first time interval.

9. The method according to claim 1, wherein the method further comprises:
acquiring, by the terminal device, the movement information.

10. The method according to claim 9, wherein acquiring, by the terminal device, the movement information comprises:
recording, by the terminal device, the movement information at a time point when receiving a command of entering the RRC inactive state and/or at a time point when performing cell reselection in the RRC inactive state.

11. The method according to claim 9, wherein acquiring, by the terminal device, the movement information comprises:
recording, by the terminal device, the movement information according to a preconfigured time interval.

12. The method according to claim 1, wherein the movement information is a second time interval from current location update to previous location update of the terminal device, and the message requesting to resume the RRC connected state is used for indicating that the current location update type of the terminal device is a cross area paging area.

13. The method according to claim 1, wherein the method further comprises:
receiving, by the terminal device, a paging message sent by the access network device when the terminal device is in an RRC inactive state again, wherein the paging message is used for indicating that downlink data for the terminal device needs to be sent.

14. An access network device, comprising:
a memory, a processor, an input interface, and an output interface;
wherein the memory is used for storing instructions, and the processor is used for executing the instructions stored in the memory to control the input interface to perform an act of:
receiving movement information of a terminal device sent by the terminal device;
wherein the movement information is movement information of the terminal device in a previous radio resource control (RRC) inactive state; and
wherein the processor is used for executing the instructions stored in the memory to perform an act of:
determining a target paging area where the access network device initiates paging to the terminal device; and
configuring the target paging area to the terminal device,
wherein the movement information comprises time information, and the time information is used for indicating duration of stay in each serving cell.

15. The access network device according to claim 14, wherein the movement information further comprises at least one of: a serving cell list, time information, or location information.

16. The access network device according to claim 14, wherein the movement information is: movement speed information.

17. The access network device according to claim 15, wherein the location information is used for indicating location information of the terminal device in each serving cell on which the terminal device camps during a movement process of the terminal device in the previous RRC inactive state.

18. The access network device according to claim 17, wherein the processor is used for executing the instructions stored in the memory to perform an act of:
determining all serving cells corresponding to the location information as the target paging area.

19. The access network device according to claim 14, wherein the processor is further used for executing the instructions stored in the memory to perform an act of:
receiving a message requesting to resume an RRC connected state sent by the terminal device, wherein the message requesting to resume the RRC connected state is used for indicating a current location update type of the terminal device, and location update types comprise periodic location update and cross paging area update.

20. The access network device according to claim 14, wherein the processor is used for executing the instructions stored in the memory to perform an act of:
initiating paging to the terminal device in the target paging area when downlink data for the terminal device needs to be sent.

21. The access network device according to claim 20, wherein the processor is used for executing the instructions stored in the memory to perform an act of:
when the terminal device is in the RRC inactive state again and the downlink data needs to be sent, initiating the paging to the terminal device in the target paging area.

22. A terminal device, comprising:
a memory, a processor, an input interface, and an output interface;
wherein the memory is used for storing instructions, and the processor is used for executing the instructions stored in the memory to control the output interface to perform an act of:
sending movement information of the terminal device to an access network device;
wherein the movement information is movement information of the terminal device in a previous radio resource control (RRC) inactive state; and
wherein the processor is used for executing the instructions stored in the memory to control the input interface to perform an act of:
receiving a target paging area where the access network device initiates paging to the terminal device, wherein the target paging area is determined by the access network device,
wherein the movement information comprises time information, and the time information is used for indicating duration of stay in each serving cell.

* * * * *